United States Patent
Qiao et al.

(10) Patent No.: US 11,988,294 B2
(45) Date of Patent: May 21, 2024

(54) SINTERED VALVE SEAT INSERT AND METHOD OF MANUFACTURE THEREOF

(71) Applicant: L.E. Jones Company, Menominee, MI (US)

(72) Inventors: Cong Yue Qiao, Menominee, MI (US); David M. Doll, Fort Worth, TX (US)

(73) Assignee: L.E. Jones Company, Menominee, MI (US)

( * ) Notice: Subject to any disclaimer, the term of this patent is extended or adjusted under 35 U.S.C. 154(b) by 562 days.

(21) Appl. No.: 17/243,821

(22) Filed: Apr. 29, 2021

(65) Prior Publication Data

US 2022/0349487 A1    Nov. 3, 2022

(51) Int. Cl.
*F16K 25/00* (2006.01)
*B22F 3/12* (2006.01)
(Continued)

(52) U.S. Cl.
CPC ............. *F16K 25/005* (2013.01); *B22F 3/12* (2013.01); *B22F 3/24* (2013.01); *B22F 5/008* (2013.01); *F01L 3/02* (2013.01); *B22F 2003/248* (2013.01); *B22F 2301/10* (2013.01); *B22F 2301/15* (2013.01); *B22F 2301/35* (2013.01); *B22F 2302/40* (2013.01); *F01L 2301/00* (2020.05); *F01L 2303/00* (2020.05)

(58) Field of Classification Search
CPC .... B22F 3/12; B22F 3/24; B22F 5/008; B22F 2003/248; B22F 2301/35; B22F 2302/40; B22F 1/10; C22C 38/22; C22C 38/24; C22C 38/30; C22C 38/36; C22C 33/0285
See application file for complete search history.

(56) References Cited

U.S. PATENT DOCUMENTS

| 4,836,848 A | 6/1989 | Mayama et al. |
| 4,970,049 A | 11/1990 | Baker et al. |

(Continued)

FOREIGN PATENT DOCUMENTS

| CN | 1517518 A | 8/2004 |
| CN | 10157112 A | 8/2009 |

(Continued)

OTHER PUBLICATIONS

Extended European Search Report mailed Aug. 31, 2022 in corresponding European Patent Application No. 22169809.5-1103, 7 pages.

(Continued)

*Primary Examiner* — Brian D Walck
*Assistant Examiner* — Nazmun Nahar Shams
(74) *Attorney, Agent, or Firm* — Buchanan Ingersoll & Rooney PC

(57) ABSTRACT

A powder admixture useful for making a sintered valve seat insert includes a first iron-base powder and second iron-base powder wherein the first iron-base powder has a higher hardness than the second iron-base powder, the first iron-base powder including, in weight percent, 1-2 % C, 10-25 % Cr, 5-20 % Mo, 15-25 % Co, and 30-60 wt. % Fe, and the second iron-base powder including, in weight %, 1-1.5 % C, 3-15 % Cr, 5-7 % Mo, 3-6 % W, 1-1.7 % V, and 60-85 % Fe. The powder admixture can be sintered to form a sintered valve seat insert optionally infiltrated with copper.

16 Claims, 5 Drawing Sheets

(51) Int. Cl.
*B22F 3/24* (2006.01)
*B22F 5/00* (2006.01)
*F01L 3/02* (2006.01)

(56) References Cited

U.S. PATENT DOCUMENTS

| | | | |
|---|---|---|---|
| 5,031,878 A | 7/1991 | Ishikawa et al. |
| 5,273,570 A | 12/1993 | Sato et al. |
| 5,312,475 A | 5/1994 | Purnell et al. |
| 5,462,573 A | 10/1995 | Baker et al. |
| 5,466,276 A | 11/1995 | Sato et al. |
| 5,489,324 A | 2/1996 | Takahasi et al. |
| 5,498,483 A | 3/1996 | Ito et al. |
| 5,529,602 A | 6/1996 | Ishii et al. |
| 5,759,227 A | 6/1998 | Takahashi et al. |
| 5,784,681 A | 7/1998 | Purnell et al. |
| 5,824,922 A | 10/1998 | Aonuma et al. |
| 5,834,664 A | 11/1998 | Aonuma et al. |
| 5,859,376 A | 1/1999 | Ishibashi et al. |
| 5,895,517 A | 4/1999 | Kawamura et al. |
| 5,949,003 A | 9/1999 | Aoki et al. |
| 6,082,317 A | 7/2000 | Takashi et al. |
| 6,139,598 A | 10/2000 | Narasimhan et al. |
| 6,139,599 A | 10/2000 | Takahashi et al. |
| 6,214,080 B1 | 4/2001 | Narasimhan et al. |
| 6,302,937 B1 | 10/2001 | Hayashi et al. |
| 6,305,666 B1 | 10/2001 | Sakai |
| 6,318,327 B1 | 11/2001 | Takahashi et al. |
| 6,340,377 B1 | 1/2002 | Kawata et al. |
| 6,348,079 B1 | 2/2002 | Choo |
| 6,436,338 B1 | 8/2002 | Qiao |
| 6,613,120 B2 | 9/2003 | Ando et al. |
| 6,641,779 B2 | 11/2003 | Kawase et al. |
| 6,660,056 B2 | 12/2003 | Hayashi et al. |
| 6,676,724 B1 | 1/2004 | Narasimhan et al. |
| 6,679,932 B2 | 1/2004 | Birler et al. |
| 6,702,905 B1 | 3/2004 | Qiao et al. |
| 6,712,871 B2 | 3/2004 | Oh |
| 6,783,568 B1 | 8/2004 | Bowskill et al. |
| 6,793,876 B2 | 9/2004 | Kawakami et al. |
| 6,802,883 B2 | 10/2004 | Henmi et al. |
| 6,951,579 B2 | 10/2005 | Koyama |
| 7,014,677 B2 | 3/2006 | Takiguchi et al. |
| 7,144,440 B2 | 12/2006 | Ando |
| 7,241,327 B2 | 7/2007 | Henmi et al. |
| 7,273,508 B2 | 9/2007 | Sato et al. |
| 7,300,490 B2 | 11/2007 | Ozaki et al. |
| 7,572,312 B2 | 8/2009 | Kawata et al. |
| 7,575,619 B2 | 8/2009 | Kawata et al. |
| 7,601,196 B2 | 10/2009 | Kawata et al. |
| 7,867,315 B2 | 1/2011 | Yamamoto et al. |
| 7,892,481 B2 | 2/2011 | Yoshihiro et al. |
| 8,032,761 B2 | 10/2011 | Rodgers et al. |
| 8,110,020 B2 | 2/2012 | Bergman et al. |
| 8,257,462 B2 | 9/2012 | Christopherson, Jr. et al. |
| 8,277,533 B2 | 10/2012 | Farthing et al. |
| 8,733,313 B2 | 5/2014 | Sato et al. |
| 8,801,828 B2 | 8/2014 | Christopherson, Jr. et al. |
| 8,876,936 B2 | 11/2014 | Kim et al. |
| 8,940,110 B2 | 1/2015 | Qiao et al. |
| 9,175,584 B2 | 11/2015 | Lee et al. |
| 9,334,547 B2 | 5/2016 | Qiao et al. |
| 9,359,921 B2 | 6/2016 | Hashimoto et al. |
| 9,556,761 B2 | 1/2017 | Koyama et al. |
| 9,803,268 B2 * | 10/2017 | Oshige .................. F01L 3/08 |
| 9,932,867 B2 | 4/2018 | Qiao et al. |
| 9,950,369 B2 | 4/2018 | Shinohara et al. |
| 9,976,202 B2 | 5/2018 | Ando et al. |
| 10,036,287 B2 | 7/2018 | Koyama et al. |
| 10,058,922 B2 | 8/2018 | Shinohara et al. |
| 10,207,328 B2 | 2/2019 | Takashita et al. |
| 10,213,830 B2 | 2/2019 | Shinohara et al. |
| 10,232,438 B2 | 3/2019 | Christopherson, Jr. et al. |
| 10,233,793 B2 | 3/2019 | Shimada et al. |
| 10,272,496 B2 | 4/2019 | Beerens et al. |
| 10,273,838 B2 | 4/2019 | Ikemi et al. |
| 10,344,636 B2 | 7/2019 | Hashimoto |
| 10,428,700 B2 | 10/2019 | Ikemi et al. |
| 10,563,548 B2 | 2/2020 | Hashimoto |
| 10,584,618 B2 | 3/2020 | Hashimoto |
| 10,605,374 B2 | 3/2020 | Takaki et al. |
| 10,619,229 B2 | 4/2020 | Shinohara et al. |
| 10,661,344 B2 | 5/2020 | Ohmori et al. |
| 10,677,109 B2 | 6/2020 | Qiao et al. |
| 10,837,087 B2 | 11/2020 | Beaulieu et al. |
| 2001/0037842 A1 | 11/2001 | Hayashi et al. |
| 2002/0084004 A1 | 7/2002 | Takahashi et al. |
| 2003/0230164 A1 | 12/2003 | Henmi et al. |
| 2005/0193861 A1 | 8/2005 | Sato et al. |
| 2011/0023808 A1 | 2/2011 | Sato et al. |
| 2017/0209928 A1 | 7/2017 | Shinohara et al. |
| 2018/0149280 A1 | 5/2018 | Takaki et al. |
| 2019/0381570 A1 | 12/2019 | Heckendorn et al. |
| 2020/0071803 A1 | 3/2020 | Kim |

FOREIGN PATENT DOCUMENTS

| | | |
|---|---|---|
| EP | 1536028 A2 | 1/2005 |
| GB | 2451898 A | 2/2009 |
| JP | H1121659 A | 1/1999 |
| KR | 20120125817 A | 11/2012 |
| WO | 2009024809 A1 | 2/2009 |

OTHER PUBLICATIONS

First Office Action mailed Apr. 5, 2023 in corresponding Chinese Patent Application No. 202210433615.8, 9 pages.

* cited by examiner

SINTERED VALVE SEAT INSERT AND METHOD OF MANUFACTURE THEREOF

BACKGROUND

Powder metallurgy (PM) valve seat insert (VSI) materials continuously face significant challenges for medium to heavy duty internal combustion (IC) engine VSI applications in terms of wear resistance, thermal shock resistance, fatigue cracking resistance, corrosion resistance, and insert retention capability. Iron-based sintered valve seat inserts typically have additions of intermetallic and/or silicide hard particles. Obtaining a uniform distribution of such hard particles can be difficult to achieve and the final product may have less than optimal properties due to the presence of such hard particles. For example, two commercial PM VSI materials, AP grade and S grade PM materials include high hardness particles such as tribaloy powder and VCN. One of them was made with double pressing and double sintering (2P2S) process while the other was made with single sintering plus copper infiltration process and; the one with 2P2S process significant overperformed the one made with sintering plus copper infiltrated process in multiple engine tests.

Copper infiltration can fill PM porosity and thus improve wear resistance when a VSI service temperature is not very high. Copper/copper alloy possess low melting temperature, low strength, and high affinity to many other metals/alloys compared to common iron-, nickel-, or cobalt-based alloys. Thus, at elevated temperature, a larger amount of copper infiltration can augment adhesive wear propensity and potentially degrade PM VSI material performance. For the same reason, infiltration copper formed with capillary reaction in thin waving sheet formation can effectively benefit wear resistance contrasted to chunky copper formation in a part through gravitational copper-fill.

Contemporary IC engine design must take into account high service temperature and pressure environments. Copper infiltrated VSI will increase heat transfer rate to carry out exhaust heat from valve to engine counterbore which lessens the temperature gradient in radial orientation for a VSI. Therefore, the maximum temperature in the contact surface between VSI OD and counterbore for a copper infiltrated VSI is higher than for a non-copper infiltrated VSI. As a result, a VSI with copper infiltration can possess a lower retention capability than non-copper-infiltrated version making it more sensitive to insert drop-out. The effect of copper infiltration on part retention capability is related to form and amount of copper in a PM VSI.

The most widely used PM bonding mechanism is diffusion bonding through a sintering process. The sintering process affects the bonding strength among neighboring powders in a PM material thus, has a significant effect on the material wear resistance. Double pressing and double sintering (2P2S) can increase the density and powder bonding strength. However, 2P2S will not able to alter uniformity of powder distribution along with the evident penalty of higher process cost. Therefore, there is a need for a desired bonding strength concept that should start with powder admix design, compacting condition, and adequate sintering parameters.

SUMMARY

In an embodiment, a powder admixture useful for making a sintered valve seat insert comprises a first iron-base powder and second iron-base powder wherein the first iron-base powder has a higher hardness than the second iron-base powder, the first iron-base powder including, in weight percent, 1-2% C, 10-25% Cr, 5-20% Mo, 15-25% Co, and 30-60 wt. % Fe, and the second iron-base powder including, in weight %, 1-1.5% C, 3-15% Cr, 5-7% Mo, 3-6% W, 1-1.7% V, and 60-85% Fe.

According to various options, (a) the first iron-base powder has a microstructure of interdendritic and intradendritic solidification substructures with up to 25% sigma phase; (b) the powder admixture further includes up to 20% Fe powder; (c) the powder admixture includes up to 3% Cu powder; (d) the powder admixture includes up to 2% MnS powder; (e) the powder admixture includes up to 2% die lubricant; (f) the first iron-base powder includes up to 1% Mn, up to 1% Si, up to 5% Ni, up to 5% W, up to 2% V, up to 0.5% B, up to 0.1% P, up to 0.1% S, up to 0.5% N, and up to 5% Nb; (g) the second iron-base powder includes up to 1% Mn, up to 1% Si, and is optionally Ni-free, optionally Co-free, and optionally Nb-free; (h) the first iron-based powder is present in an amount of 40-60 wt. % and the second iron-based powder is present in an amount of 20-40 wt. %; (i) the powder admixture includes Fe powder, Cu powder and MnS powder, the first iron-based powder is present in an amount of 40-60 wt. %, the second iron-based powder is present in an amount of 20-40 wt. %, the Fe powder is present in an amount of 15-20 wt. %, the Cu powder is present in an amount of 1-3%, and the MnS powder is present in an amount of 0.1-1 wt. %; (j) the powder admixture is free of additive silicide, carbide, nitride, carbonitride and intermetallic hard particle powders; (k) the first iron-base powder has a microstructure consisting of 40-60 vol. % interdendritic and 60-40 vol. % intradendritic regions; and/or (l) the powder admixture is free of Co-base, Mo-base, or other hard particle powders having a hardness greater than the hardness of the first iron-base powder.

The powder admixture can be used to manufacture a sintered valve seat inert wherein the powder admixture has been compacted in the shape of a valve seat insert, sintered to form a sintered powder admixture optionally infiltrated with copper.

According to various options, (a) the sintered powder admixture has a density of at least 7.5 g/cm$^3$; (b) the first iron-base powder has a microstructure consisting of 40-60 vol. % interdendritic and 60-40 vol. % intradendritic regions; (c) the sintered admixture is free of hard particles having a hardness greater than the hardness of the first iron-base powder; (d) the sintered admixture is free of additive silicide, carbide, nitride, carbonitride, Mo-base, Co-base or intermetallic hard particle powders; (e) the first iron-based powder is present in an amount of 40-60 wt. %, the second iron-based powder is present in an amount of 20-40 wt. %, and Fe powder is present in an amount of 15-20 wt. %; and/or (f) the first iron-based powder is present in an amount of 40-60 wt. %, the second iron-based powder is present in an amount of 20-40 wt. %, Fe powder is present in an amount of 15-20 wt. % and copper is present in an amount of 10-15 wt. %.

A method of manufacturing the sintered valve seat insert can comprise forming an admixture by mixing the first iron-based powder with the second iron-based powder, compacting the admixture, and sintering the admixture.

According to various options, (a) the sintering comprises preheating the powder admixture at 560° C., 850° C., and 950° C. for 5-20 minutes followed by 1120° C. sintering for 40-60 minutes; (b) the sintering comprises a double pressing and double sintering process; (c) subjecting the sintered valve seat insert to cryogenic treatment in liquid nitrogen; (d) subjecting the sintered valve seat insert to a steam treatment; and/or (e) the sintering is carried out while infiltrating the admixture with copper.

DETAILED DESCRIPTION

Figure 1:
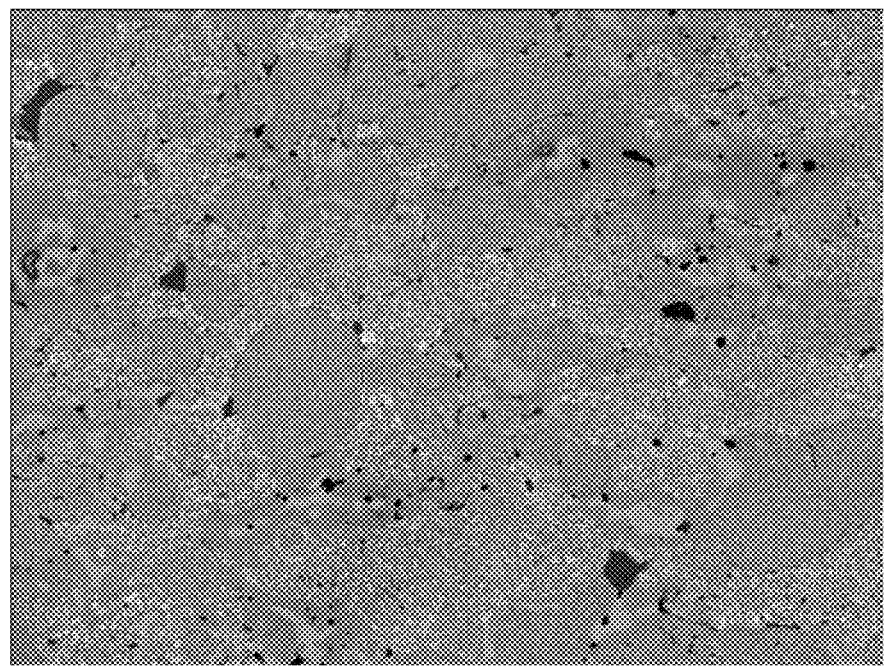
FIG. 1 shows the general microstructural morphology of a backscattered electron image of a sintered admixture of iron base powders (JP513).

Disclosed herein is a PM VSI material (referred to herein as "JP513") which eliminates the need to include hard intermetallic/silicide hard particles by using an admixture of two iron-base powders. JP513 includes two iron-base powders which can be pressed and sintered to form valve seat inserts suitable for medium- and heavy-duty engine applications. An SEM/EDS assisted metallographic investigation reveals that JP513 possesses desired bonding between the two iron-base powders, binders, and additive powders.

One of the key factors affecting PM VSI performance is compact density. Performance issues relating to wear resistance, cracking resistance, and retention capability of a PM VSI can be traced to the compact density/density distribution which is associated with powder admixing process, powder shape, uniformity and size distribution of the powders. Therefore, it is desirable to achieve sound density and desired density distribution for a heavy-duty PM material design and manufacturing. Some of the latest PM VSI materials contain high amounts of hard particles possessing good wear resistance such as VCN. However, if a compact density or/and density distribution is not achieved, the hard particles cannot play a role to enhance the PM materials strength as intended.

For instance, two commercial PM VSI materials, AP grade and S grade, are made with inclusion of high hardness particles such as VCN. One of them was made with a double pressing, double sintering (2P2S) process while the other was made with single sintering plus copper infiltration process. The one made with the 2P2S process significantly over performed the one made with the sintering plus copper infiltrated process in multiple engine tests.

Copper infiltration can fill PM porosity thus improve wear resistance when a VSI service temperature is not very high. Copper and copper alloys typically have a relatively low melting temperature, low strength, and high affinity to many other metals/alloys. Thus, such copper or copper alloys can affect adhesive wear propensity and have a significant impact on PM VSI material performance. For the same reason, infiltration copper formed with capillary reaction in thin waving sheet formation can effectively benefit wear resistance as compared to chunky copper formation in a part through gravitational copper-fill.

Contemporary IC engine design requires consideration of high service temperature and pressure. A copper infiltrated VSI will increase the heat transfer rate to carry out exhaust heat from valve to engine counterbore which lessens the temperature gradient in radial orientation for a VSI. Therefore, the maximum temperature on the contact surfaces between VSI OD and engine cylinder head counterbore for a copper infiltrated VSI is higher than a non-copper infiltrated version an engine. As a result, a VSI with copper infiltration can possess a lower retention capability than non-copper-infiltrated version and is more sensitive to insert drop-out. The effect of copper infiltration on part retention capability is related to form and amount of copper in a PM VSI.

The most widely used PM powder bonding mechanism is diffusion bonding through a sintering process. The sintering process affects the bonding strength among neighboring powders in a PM material thus, has a significant effect on the material wear resistance. Double pressing and double sintering (2P2S) can increase the density and powder bonding strength. However, 2P2S will not be able to alter uniformity of powder distribution along with the evident penalty of higher process cost. Therefore, a desired bonding strength should start with powder admix design, compacting condition, and adequate sintering parameters.

Additive copper powder can be used to create transient liquid phase formation during a sintering process to diffuse into the iron and iron-base powders during the initial stage of sintering process. The melting point of copper is 1083° C. which is lower than typical sintering temperatures (e.g., 1120° C.). At the initial sintering process, the iron-base powders possess high copper solubility. The level and amount of copper diffusion in the iron-base powders is related to sintering temperature and duration. The copper diffusion into the iron-base powders can assist bonding between the iron-base powders and the other additive powders, i.e. additive copper can effectively assist bonding formation between the iron-base powders and other additive powders through a transient liquid phase sintering process. In addition, the iron-base powders with diffusion copper augment the hardenability of the sintered material. When the copper diffusion process stops, any remaining copper liquid can fill the gaps formed between compacted powders via a process that thermodynamically minimizes the free enthalpy of interfaces. Combined with properly designed compact density and density distribution, the admixed copper powder approach can reduce the amount of PM porosities and form stronger bonding compared to the effect from infiltrated copper.

In JP513, up to 20 wt. % (e.g., 15-20 wt. %, 16-19 wt. %, 17-18 wt. %) pure iron powder is included as a binder powder for which copper's solubility is up to 10 wt. %. The copper can diffuse into the iron powder and thereby increase the strength of pure iron powder to minimize strength variation between powders and powder boundaries.

Steam treatment can be a very cost-effective process for iron-based powder materials used in VSI non-copper infiltration applications. Like the copper infiltration process, the optimal effect to a PM VSI material of a steam treatment process is directly related to the PM apparent density, specifically the PM porosity size, shape, and distribution. The iron oxides formed during steam treatment can benefit the PM wear performance. However, a significant amount of iron oxide formation can degrade the bonding formed between powder particles.

The JP513 powder admixture can include 40-60 wt. % (e.g., 45-55 wt. %, 48-52 wt. %, 50 wt. %) of a first iron-base powder and 20-40 wt. % (e.g., 25-35 wt. %, 28-32 wt. %, 30 wt. %) of a second iron-base powder. Both of the iron-base powders can have the same particle size range but differ in compositions. The first iron-base powder can include, in weight (wt.) %, 1-2% C, 10-25% Cr, 5-20% Mo, 15-25% Co and 30-60% Fe whereas the second iron-base powder can include 1-1.5% C, 3-15% Cr, 5-7% Mo, 3-6% W, 1-1.7% V and 60-85% Fe. The JP513 powder admixture can also include up to 20% pure Fe, up to 3% Cu powder, a machinability enhancing additive such as MnS powder and a die lubricant such as Zn stearate. As an example, the admixture can include 50% of the first iron-base powder, 30% of the second iron-base powder, 17% of the pure Fe powder, 2% Cu powder, 0.5% MnS powder and 0.5% die lubricant.

The first iron-base powder can be an atomized powder which has been annealed and preferably does not go through significant phase transformation after sintering. However, the first iron-base powder may undergo some bainitic phase transformation during cooling down period after sintering process (e.g., 1120° C. sintering) which starts at about 235° C. and is completed at about 165° C. within a cooling rate between 1° C./min through 6° C./min. The second iron-base powder preferably goes through a martensitic phase transformation during cooling down period from a sintering process (e.g., 1120° C. sintering) which starts at about 245° C. (Ms) and finishes at about −10° C. (Mf). Therefore, a sub-zero cryogenic treatment will benefit JP513 materials properties such as dimensional stability, fatigue strength, and VSI retention capability.

During sintering, the JP513 powder admixture can be optionally infiltrated with copper. Based upon capillary force fundamentals, "thin" porosity in the compacted powder is preferred for a copper infiltration process. In an example, near spherical or ellipsoid powder can be used for the first iron-base powder and the compacted powder can be infiltrated with approximately 13 wt. % infiltration copper. With thin gap formation among the powder particulates after compacting, copper infiltration can be beneficial to VSI performance.

The JP513 powder admixture can be subjected to a hot forging application. The concept of applying a powder metal forging process is to substantially increase the component density to near 100% theoretic number. Thus, by using a malleable powder as the second iron-base powder and a powder which is not suitable for hot forging as the first iron-base powder, the admixture can be hot forged to a desired density. From the same considerations, JP513 powder admixture can be used to apply metal injection molding (MIM) process.

Several experiments of a JP513 admixture were made after establishment of compacting pressure, sintering, copper infiltration and cryogenic treatment processes to evaluate effect of M type tool steel powders as the second iron-base powder available from three different powder suppliers. This metallurgical evaluation has carried out after a dimensional stability test revealed that JP513 possesses sound dimensional stability when it includes the three M type tool steel powders regardless from which materials supplier.

FIG. 1 shows the general microstructural morphology of a backscattered electron image of JP513. The powder domains for the iron-base powders can be clearly defined in the photomicrograph. The first iron-base powder was not significantly deformed under compacting force while the second iron-base and pure iron powders were significantly deformed which allows a good bonding formation between the powders. It is also evident that diffusion of copper phase taken place which assists the bonding between powders.

Figure 2:
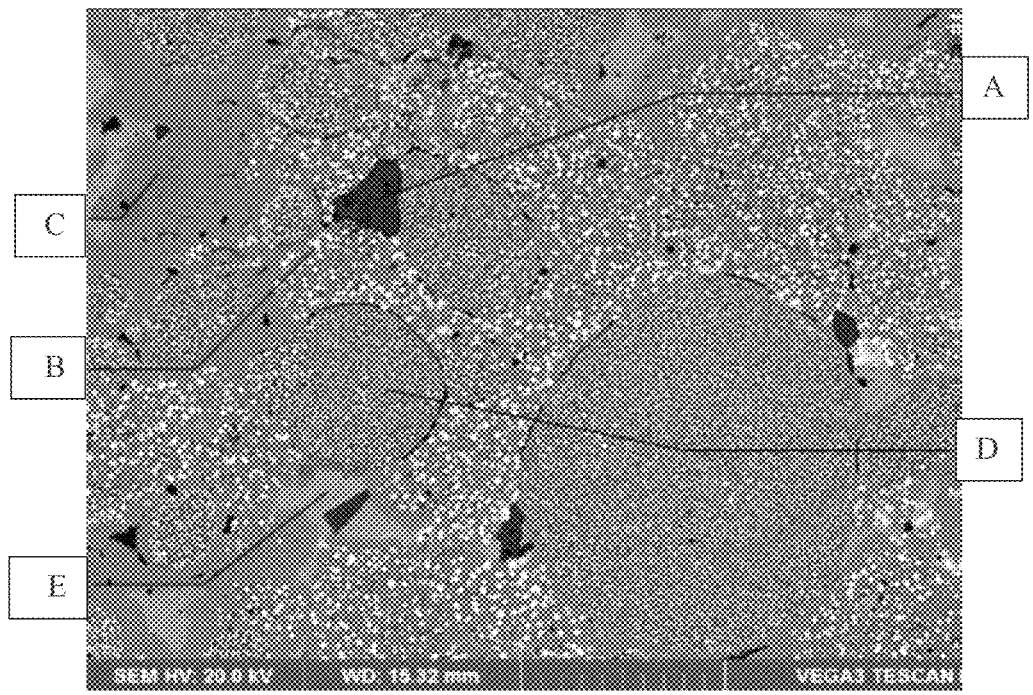
FIG. 2 depicts an enlarged image of the area marked in FIG. 1.

FIG. 2 depicts an enlarged image of the area marked in FIG. 1. The shape of MnS powder significantly varied depending upon where a MnS powder is located. As expected, 17 wt. % of pure iron powder completely joined with all powder types present in the JP513 admixture. It can be also observed that significant amount of infiltration copper was penetrated through gaps between pure iron powders likely due to a higher capillary force which existed between pure iron particulates. The bright colored fine particles in the second iron-base powder are molybdenum and chromium rich carbides. The size and distribution of the carbides mainly formed during the powder atomization process.

Figure 3:
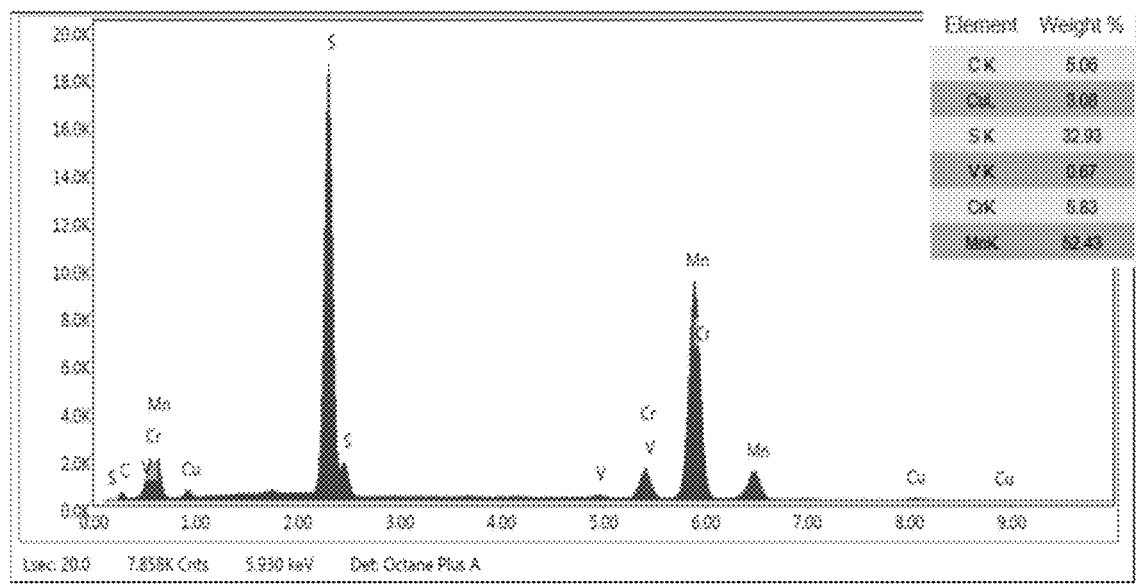
FIG. 3 shows an EDS analysis of area marked as A in FIG. 2.

FIG. 3 shows the EDS analysis result of an area marked A in FIG. 2 which corresponds to MnS powder added in JP513 as a solid lubricant.

Figure 4:
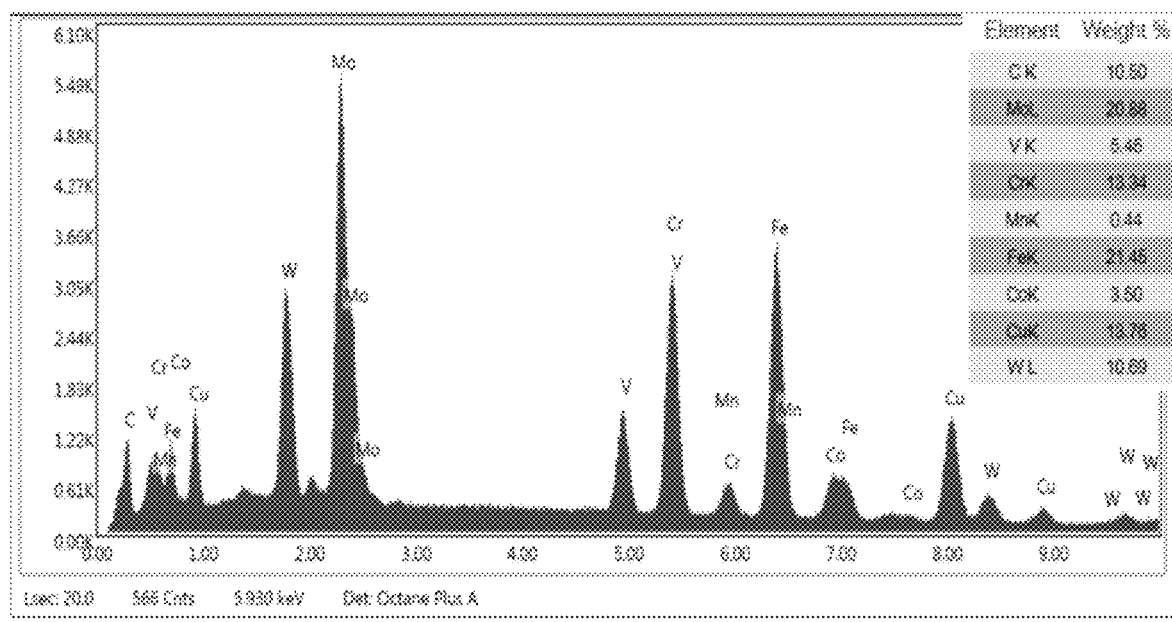
FIG. 4 shows an EDS analysis of area marked as B in FIG. 2.

FIG. 4 shows the EDS analysis result of an area marked B in FIG. 2 which corresponds to a high chromium and molybdenum carbide in the second iron-base powder.

Figure 5:
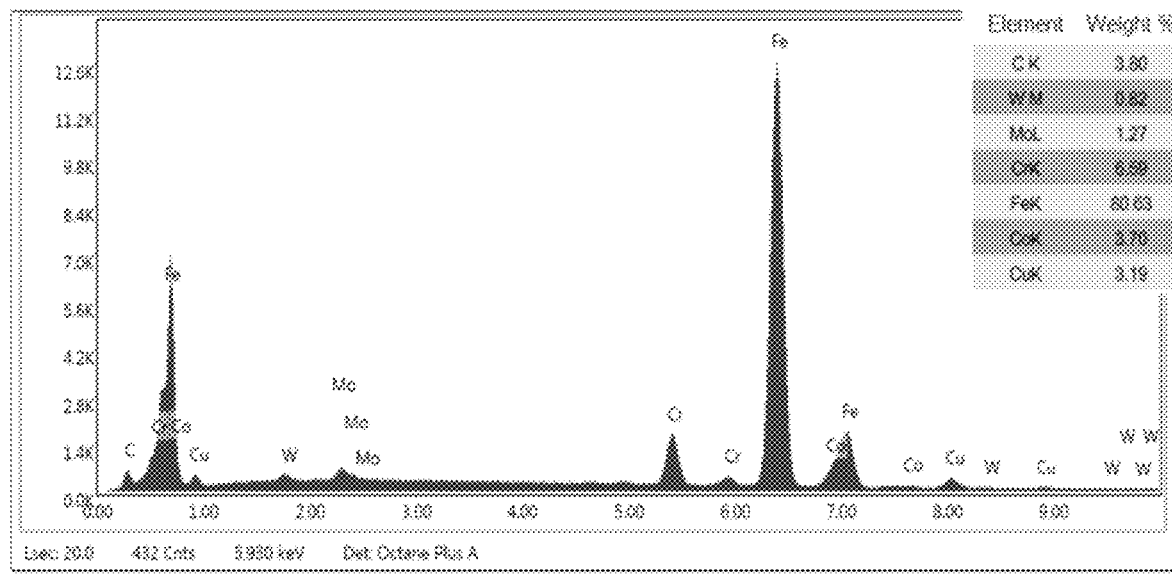
FIG. 5 shows an EDS analysis of area marked as C in FIG. 2.

FIG. 5 shows the EDS analysis result of an area marked C in FIG. 2 which corresponds a bright grayish powder as "pure" iron powder.

Figure 6:
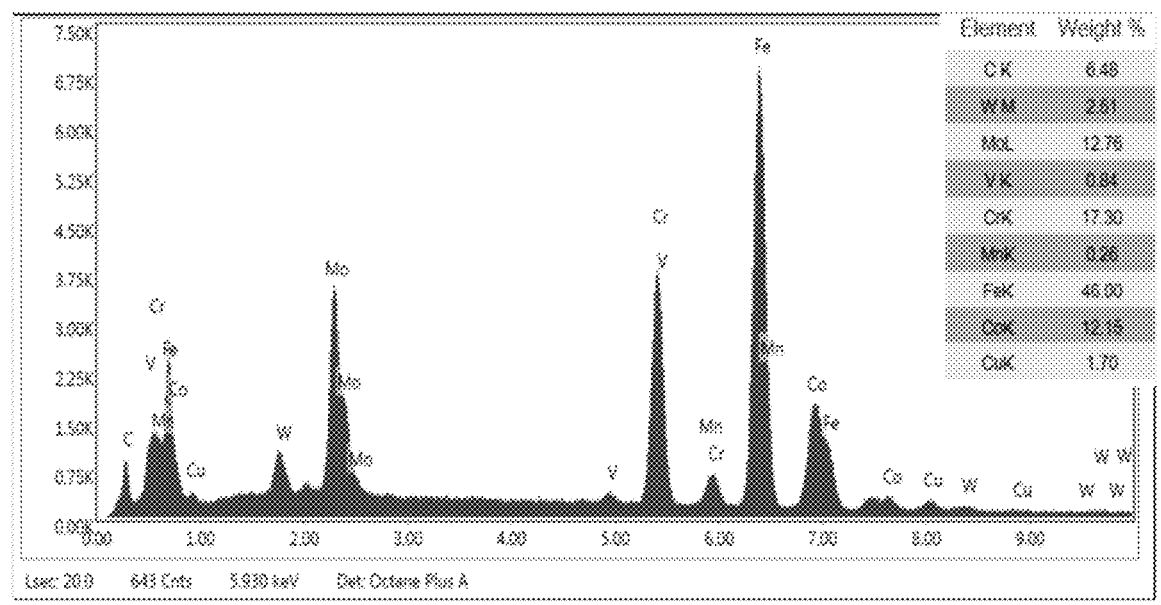
FIG. 6 shows an EDS analysis of area marked as D in FIG. 2.

FIG. 6 shows the EDS analysis result of an area marked D in FIG. 2 which corresponds to the first iron-base powder which appears spherical in shape and well bonded with the second iron-base powder and pure iron powder.

Figure 7:
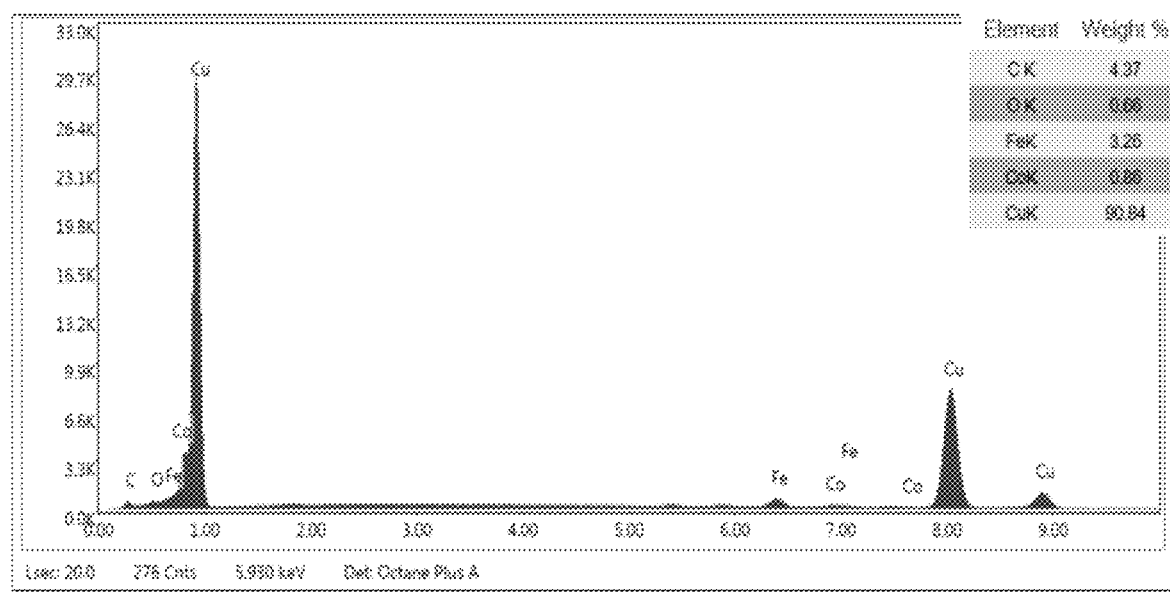
FIG. 7 shows an EDS analysis of area marked as E in FIG. 2.
Figure 8:
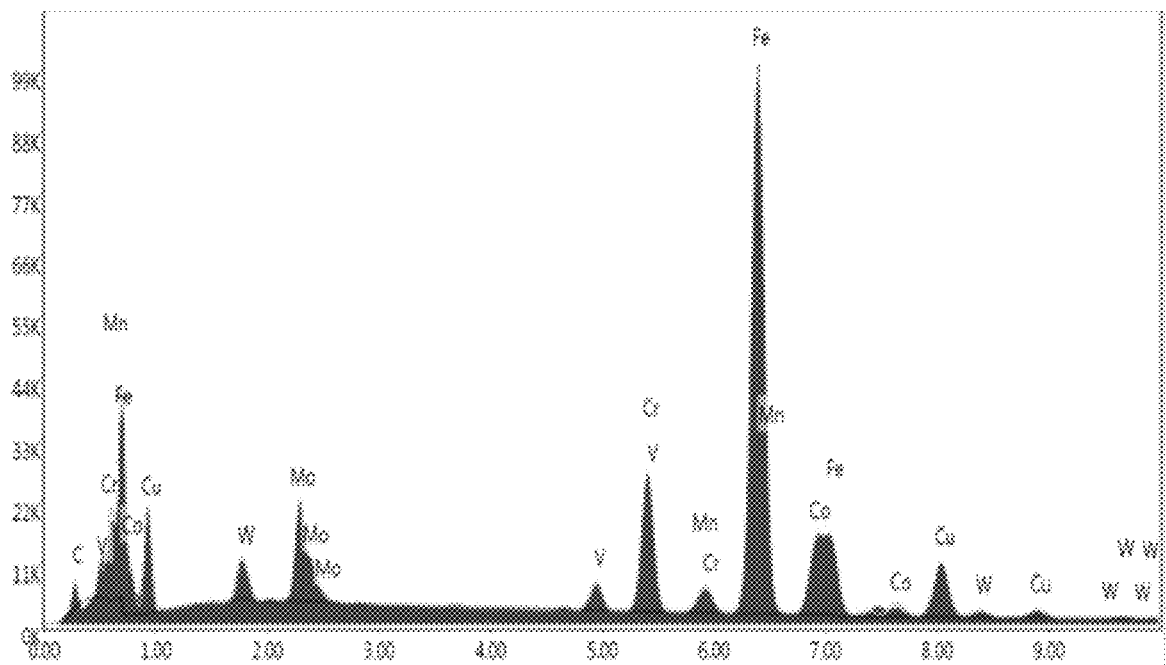
FIG. 8 shows an EDS analysis of a general area reflecting bulk composition of JP513.

FIG. 7 shows an EDS analysis of the area marked E in FIG. 2 which is an area of infiltration copper.

The apparent hardness at approximate HRc 49 for JP513 is suitable for heavy duty intake and exhaust engine VSI applications. It can be noted herein that JP513 powder admixture is designed such that steam treatment can be effectively applied to enhance the materials tribo performance especially with the non-copper infiltrated version.

JP513 PM VSI's can be manufactured using a conventional compacting and sintering process. The JP513 powder admixture concept includes two iron-base powders, iron binder powder, and additive powders to enhance processing ability and intended engineering application performance. The JP513 powder includes a high hardness first iron-base powder with spherical and/or ellipsoid shapes combined with a malleable softer second iron-base powder to provide JP513 with high apparent density PM engineering parts for high wear resistance applications. The bonding among the two iron-base powders, iron binder powder, solid lubrication powder and additive copper powder was sound with high sintered density (>7.5 g/cm$^3$). Moreover, admix capability of JP513 with the powder characteristics and distribution was desirable and a very uniform powder mixing condition to achieve high possible PM materials performance was obtained.

The softer second iron-base powder and pure iron powders are irregular shaped. So, both the second iron-based powder and pure iron powder can be deformed during the compacting process such that they surround the harder first iron-based powder.

No other hard particles/powders, e.g., additive silicide, intermetallic, Mo-based, Co-based, carbide, nitride, carbonitride and Fe—Mo hard particle powders, need to be added to the JP513 powder admixture. The harder first iron-base powder has a percentage of iron rich intermetallic phases, Fe—Co solid solution phases plus a bainitic (with or without a small amount of martensite) structure which provides significant wear resistance. After compaction and sintering, the harder first iron-base powder can be present in a high percentage with uniform three dimensional distribution and the softer second iron-based powder and solid solution strengthened iron portion (after sintering) can provide the admixture with toughness needed for engineering applications along with reasonable good wear resistance.

The harder first iron-base powder includes intermetallic sigma phase and carbides which remain in the microstructure at the sintering temperature. Copper diffusion into the harder first iron-base powder is minimal and whereas copper diffused into pure iron and the softer second iron-base powder can potentially form ε-copper in the second iron-base powder inducing precipitation hardening effect and as solute to have a solid solution strengthening effect for pure iron.

In an embodiment, a powder admixture useful for making a sintered valve seat insert comprises a first iron-base powder and second iron-base powder wherein the first iron-base powder has a higher hardness than the second iron-base powder, the first iron-base powder including, in weight percent, 1-2% C, 10-25% Cr, 5-20% Mo, 15-25% Co, and 30-60 wt. % Fe, and the second iron-base powder including, in weight %, 1-1.5% C, 3-15% Cr, 5-7% Mo, 3-6% W, 1-1.7% V, and 60-85% Fe. According to various options, (a) the first iron-base powder has a microstructure of interdendritic and intradendritic solidification substructures with up to 25% sigma phase; (b) the powder admixture further includes up to 20% Fe powder; (c) the powder admixture includes up to 3% Cu powder; (d) the powder admixture includes up to 2% MnS powder; (e) the powder admixture includes up to 2% die lubricant; (f) the first iron-base powder includes up to 1% Mn, up to 1% Si, up to 5% Ni, up to 5% W, up to 2% V, up to 0.5% B, up to 0.1% P, up to 0.1% S, up to 0.5% N, and up to 5% Nb; (g) the second iron-base powder includes up to 1% Mn, up to 1% Si, and is optionally Ni-free, optionally Co-free, and optionally Nb-free; (h) the first iron-based powder is present in an amount of 40-60 wt. % and the second iron-base powder is present in an amount of 20-40 wt. %; (i) the powder admixture includes Fe powder, Cu powder and MnS powder, the first iron-based powder is present in an amount of 40-60 wt. %, the second iron-based powder is present in an amount of 20-40 wt. %, the Fe powder is present in an amount of 15-20 wt. %, the Cu powder is present in an amount of 1-3%, and the MnS powder is present in an amount of 0.1-1 wt. %; (j) the powder admixture is free of additive silicide, carbide, nitride, carbonitride and intermetallic hard powder particles; (k) the first iron-base powder has a microstructure consisting of 40-60 vol. % interdendritic and 60-40 vol. % intradendritic regions; and/or (l) the powder admixture is free of Co-base, Mo-base, or other hard particle powders having a hardness greater than the hardness of the first iron-base powder.

The powder admixture can be used to manufacture a sintered valve seat inert wherein the powder admixture has been compacted in the shape of a valve seat insert, sintered to form a sintered powder admixture optionally infiltrated with copper. According to various options, (a) the sintered powder admixture has a density of at least 7.5 g/cm³; (b) the first iron-base powder has a microstructure consisting of 40-60 vol. % interdendritic and 60-40 vol. % intradendritic regions; (c) the sintered admixture is free of hard particles having a hardness greater than the hardness of the first iron-base powder; (d) the sintered admixture is free of silicide, carbide, nitride, carbonitride, Mo-base, Co-base or intermetallic hard particles; (e) the first iron-based powder is present in an amount of 40-60 wt. %, the second iron-based powder is present in an amount of 20-40 wt. %, and Fe powder is present in an amount of 15-20 wt. %; and/or (f) the first iron-based powder is present in an amount of 40-60 wt. %, the second iron-based powder is present in an amount of 20-40 wt. %, Fe powder is present in an amount of 15-20 wt. % and copper is present in an amount of 10-15 wt. %.

A method of manufacturing the sintered valve seat insert can comprise forming an admixture by mixing the first iron-based powder with the second iron-based powder, compacting the admixture, and sintering the admixture. According to various options, (a) the sintering comprises preheating the powder admixture at 560° C., 850° C., and 950° C. for 5-20 minutes followed by 1120° C. sintering for 40-60 minutes; (b) the sintering comprises a pressing and sintering process; (c) subjecting the sintered valve seat insert to cryogenic treatment in liquid nitrogen; (d) subjecting the sintered valve seat insert to a steam treatment; and/or (e) the sintering is carried out while infiltrating the admixture with copper.

EXAMPLES

JP513 can be made from an admixture set forth in Table 1 of the following powders in which the harder first iron-base powder is designated as "P1" and the softer second iron-base powder is designated as "P2":

TABLE 1

| Powder | Condition | Target mesh size | Target mm size | Wt. % |
|---|---|---|---|---|
| P1 | Water atomized | 120 | 0.125 | 50 |
| P2 | Water atomized | 120 | 0.125 | 30 |
| Pure Fe | Reduced Fe | 80 | 0.177 | 17 |
| Pure Cu | electrolytic | 200 | 0.074 | 2 |
| Die lubricant | commercial | <35 | <0.5 | 0.5 |
| MnS | commercial | 325 | 0.044 | 0.5 |

Based upon the initial JP513 sample analysis results, JP513 PM material design has been established as an admixture of a hard iron-base powder (P1) containing intermetallic phases including sigma phase, a softer iron-base powder with a tool steel composition, pure iron, additive copper, solid lubricant along with copper infiltration. The tool steel powders (P2) include two M3/2 tool steel powders from different sources identified as Q and H and atomized J120V identified as J. Two different amounts of infiltration copper are 13 wt. % and 18 wt. %. The first and second iron-base powders are admixed with weight ratio of 1.67 (50 wt. % first iron-base powder to 30 wt. % second iron-base powder).

All the sample parts had a VSI part geometry. The powder admixture includes 50 wt. % of the first iron-base powder and 30 wt. % of the second iron-base powder (tool steel powders J, H and Q) along with 0.5 wt. % lubricant, 0.5 wt. % of MnS, 17 wt. % of reduced iron powder, and 2 wt. % of additive copper. For tool steel powders, J, Q and H were applied for a comparative evaluation purpose that exhibited an admix Hull flow rate of 31.96 sec/50 g, 31.3 sec/50 g, and 31.92 sec/50 g, respectively. Compacts were made with 0.181 T/mm², 0.140 T/mm² and, 0.147 T/mm² for admixing with J, H and Q, respectively.

A standard sintering time including preheat (48 minutes) at 560° C., 850° C. and 950° C. for 16 minutes at each temperature and sintering for 48 minutes at 1120° C. Cryogenic treatment of 15 minute immersion in liquid nitrogen was applied prior to tempering at 538° C. for one hour.

Density measurement was performed using Archimedes' method with five samples in each sample type. Bulk hardness was determined with HRc scale at ambient. The average density and bulk hardness obtained are summarized in the following Table 2 wherein the first iron-base powder is designate "P1", the second iron-base powder (P2) is designated as J, H and Q.

TABLE 2

|  | 13% Cu Infiltration | 13% Cu Infiltration | 13% Cu Infiltration | 18% Cu Infiltration | 18% Cu Infiltration | 18% Cu Infiltration |
|---|---|---|---|---|---|---|
| sample | 70% P1 30% J | 70% P1 30% H | 70% P1 30% Q | 70% P1 30% J | 70% P1 30% H | 70% P1 30% Q |
| Density g/cm$^3$ | 7.44 | 7.59 | 7.57 | 7.71 | 7.75 | 7.68 |
| Bulk Hardness | 48.8 | 53.9 | 53.6 | 50.9 | 52.4 | 50.8 |

It is clearly exhibited that for the same type of powder admixture, 18 wt. % copper infiltrated samples possessed a greater density than 13 wt. % copper infiltrated samples as expected. Hence, the higher density in 18 wt. % copper infiltrated samples is obviously related to the higher copper content. It is also revealed that excess copper in 18 wt. % copper infiltrated samples has been cladded onto bottom surface and formed a copper layer which is not observed in 13 wt. % copper infiltrated samples.

Metallographic examination reveals that 13.5-15.5 wt. % of infiltration of copper should be an adequate range for JP513 PM applications with the JP513 desired apparent compact density. For the same amount of copper infiltration namely, 13 wt. % and 18 wt. % samples tested, lower density samples possess a lower apparent bulk hardness. For instance, P1+J samples with 13 wt. % had the lowest density and apparent bulk hardness. For 18 wt. % copper infiltrated samples, a layer of copper formed on the bottom face surface of the sample part which affects actual estimation on amount of copper infiltration penetrated into the compacted admixture under the capillary action force. Nevertheless, metallographic examination revealed that virtual amount of copper infiltration in 18 wt. % copper infiltration just slightly greater than 13.0 wt. % copper infiltration for each sample. For P1+P2 samples evaluated, 14.5 wt. % copper infiltration should be close to the optimal level with the current designed compact condition. Slightly higher compacting pressure may be significantly beneficial to apparent bulk hardness.

The dimensional stability testing was carried out using five sample parts from each group. The test condition includes thermal soak at 1000° F. for one hour after heat treatment oven reached to the testing temperature followed by air-cool. The test result for 13 wt. % copper infiltrated P1+J, 18 wt. % copper infiltrated P1+J, 13 wt. % copper infiltrated P1+Q, 18 wt. % copper infiltrated P1+Q, 13 wt. % copper infiltrated P1+H, and 18 wt. % copper infiltrated P1+H, all six sample groups passed the dimensional stability test.

Under the thermal soak condition, P1+P2 with 13 wt. % copper infiltration demonstrated the least dimensional change, hence possesses high dimensional stability.

Hardness (HRc) change after dimensional thermal soak at 1000° F./one hour for all six group samples revealed only a small hardness reduction under the 1000° F./one hour and the P1+J samples had a lower apparent bulk hardness and the least hardness change, as shown in Table 3 below:

TABLE 3

Apparent bulk hardness (HRc) measurement results for 1000° F./1 hr thermal treated samples.

| Condition | P1 + J with 13 wt. % Cu infiltration | P1 + H with 13 wt. % Cu infiltration | P1 + Q with 13 wt. % Cu infiltration | P1 + J with 18 wt. % Cu infiltration | P1 + H with 18 wt. % Cu infiltration | P1 + Q with 18 wt. % Cu infiltration |
|---|---|---|---|---|---|---|
| Prior to 1 hr Thermal Soak | 48.3 | 50.1 | 51.7 | 51.8 | 54.1 | 53.3 |
| Post to 1 hr Thermal Soak | 47.6 | 49.7 | 51.1 | 49.1 | 53.3 | 52.8 |

Three-hour dimensional stability tests for the six types of samples revealed minimum dimensional variation. It should be noted that 1000° F. is very close to lower end of tempering treatment temperature for martensitic tool steels. Thus, all three powder admixes are with sound dimensional stability for common VSI applications.

The apparent bulk hardness in these samples is measured after thermal treatment and the results can be summarized in Table 4. A lower apparent bulk hardness is shown as expected after the thermal soaking. For the P1+P2 admixture, a slightly higher compact density along with slightly higher amount of copper infiltration can surely increase apparent bulk hardness. Nevertheless, even with the apparent hardness received after three hours heat soaking at 1000° F. is with decent level for a PM VSI insert material and the density in the sample along with copper infiltration applied can be used as the lower limits for JP513. Apparent bulk hardness for 5 hour, 10 hour and 20 hour dimensional stability tests are summarized in Tables 5, 6 and 7.

TABLE 4

Apparent bulk hardness (HRc) measurement results for 1000° F./3 hr thermal treated samples.

| Condition | P1 + J with 13 wt. % Cu infiltration | P1 + J with 18 wt. % Cu infiltration | P1 + Q with 13 wt. % Cu infiltration | P1 + Q with 18 wt. % Cu infiltration | P1 + H with 13 wt. % Cu infiltration | P1 + H with 18 wt. % Cu infiltration |
|---|---|---|---|---|---|---|
| Prior to 3 hr Thermal Soak | 48.3 | 50.1 | 51.7 | 51.8 | 54.1 | 53.3 |

TABLE 4-continued

Apparent bulk hardness (HRc) measurement results for 1000° F./3 hr thermal treated samples.

| Condition | P1 + J with 13 wt. % Cu infiltration | P1 + J with 18 wt. % Cu infiltration | P1 + Q with 13 wt. % Cu infiltration | P1 + Q with 18 wt. % Cu infiltration | P1 + H with 13 wt. % Cu infiltration | P1 + H with 18 wt. % Cu infiltration |
|---|---|---|---|---|---|---|
| Post to 3 hr Thermal Soak | 45.0 | 47.0 | 48.7 | 47.6 | 51.4 | 50.8 |

TABLE 5

Apparent bulk hardness (HRc) measurement results for 1000° F./5 hr thermal treated samples.

| Condition | P1 + J with 13 wt. % Cu infiltration | P1 + H with 13 wt. % Cu infiltration | P1 + Q with 13 wt. % Cu infiltration | P1 + J with 18 wt. % Cu infiltration | P1 + H with 18 wt. % Cu infiltration | P1 + Q with 18 wt. % Cu infiltration |
|---|---|---|---|---|---|---|
| Prior to 5 hr Thermal Soak | 48.3 | 50.1 | 51.7 | 51.8 | 54.1 | 53.3 |
| Post to 5 hr Thermal Soak | 44.2 | 46.1 | 47.4 | 47.1 | 49.2 | 49.1 |

TABLE 6

Apparent bulk hardness (HRc) measurement results for 1000° F./10 hrs thermal treated samples.

| Condition | P1 + J with 13 wt. % Cu infiltration | P1 + J with 18 wt. % Cu infiltration | P1 + Q with 13 wt. % Cu infiltration | P1 + Q with 18 wt. % Cu infiltration | P1 + H with 13 wt. % Cu infiltration | P1 + H with 18 wt. % Cu infiltration |
|---|---|---|---|---|---|---|
| Prior to 10 hr Thermal Soak | 48.3 | 50.1 | 51.7 | 51.8 | 54.1 | 53.3 |
| Post to 10 hr Thermal Soak | 43.0 | 46.1 | 47.0 | 45.1 | 48.3 | 48.3 |

TABLE 7

Apparent bulk hardness (HRc) measurement results for 1000° F./20 hrs thermal treated samples.

| Condition | P1 + J with 13 wt. % Cu infiltration | P1 + J with 18 wt. % Cu infiltration | P1 + Q with 13 wt. % Cu infiltration | P1 + Q with 18 wt. % Cu infiltration | P1 + H with 13 wt. % Cu infiltration | P1 + H with 18 wt. % Cu infiltration |
|---|---|---|---|---|---|---|
| Prior to 20 hr Thermal Soak | 48.3 | 50.1 | 51.7 | 51.8 | 54.1 | 53.3 |
| Post to 20 hr Thermal Soak | 40.7 | 41.9 | 44.7 | 42.0 | 45.5 | 46.5 |

Figure 9:
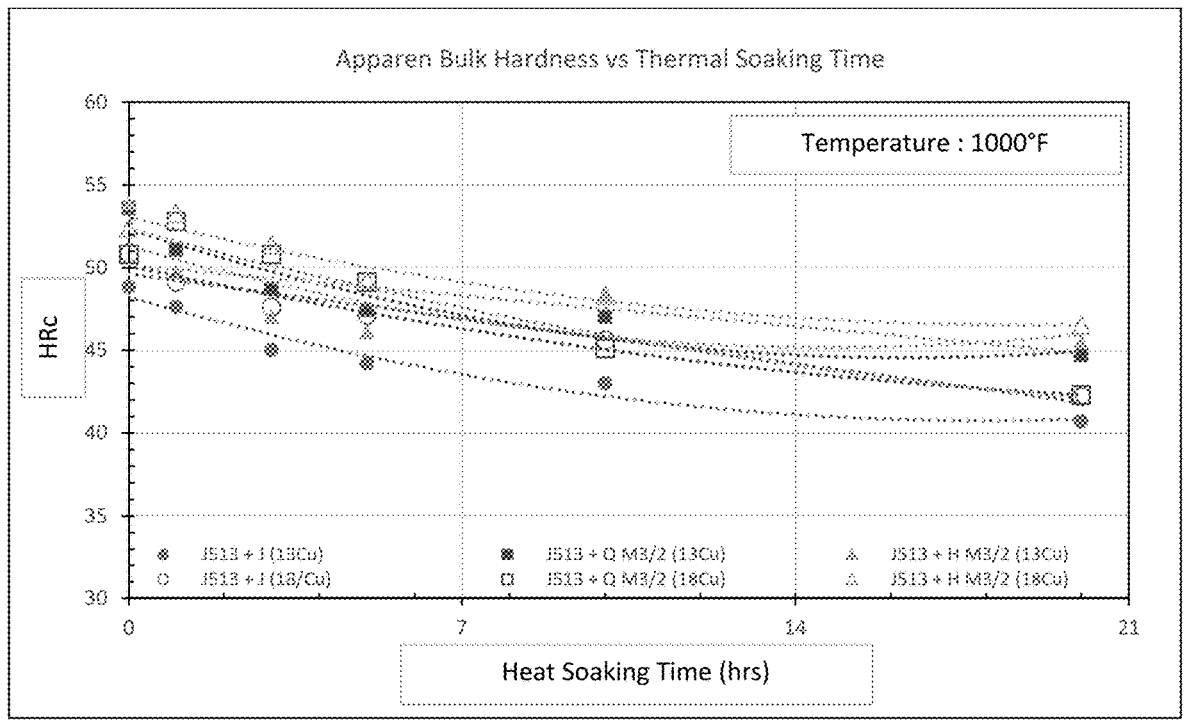
FIG. 9 is a graph of apparent bulk hardness as a function of aging time at 1000° F. for six types of samples evaluated.

FIG. 9 exhibits the behavior of apparent bulk hardness as a function of aging time at 1000° F. for all six types of samples evaluated. A clear binomial function has been shown with each of the six sample types, respectively. The apparent hardness changing rate at 20-hour aging is practically near nil for P1+J (13Cu), P1+J (18Cu), P1+Q (13Cu), and P1+H (13Cu).

An admixture of P1 (50 wt. %) with all three tool steel powders P2 (30 wt. %) shows a very similar apparent density. The amount of copper infiltration at 13 wt. % and 18 wt. % does not affect the internal microstructure for each type of tool steel powders. The excess copper on the bottom face surface has been formed in all the samples with 18 wt. % of copper infiltration. However, copper infiltration reaches at a desired level at approximate 14.5 wt. %. The apparent density of the samples is sound and no large PM porosity can be detected. P1 alloy powder can be uniformly distributed in the admixture with P2, pure iron, and the other additive powders. The spherical or ellipsoidal shaped P1 powder actually can be very beneficial to the PM materials wear resistance giving the good bonding between P1 and P2 iron-base powders has been achieved. The amount of copper infiltration is sufficient from surface to the center of VSI samples and, in fact, sample surface PM porosities are fully filled with copper.

Microhardness mapping with 500 g applied load for all six types of JP513 samples reveals a sound apparent microhardness distribution. In general, samples with 13 wt. % copper infiltration show a lower hardness under a 500 g load which is most likely related PM compact density and PM porosity density which was not fully filled by copper infiltration.

The P1 powder can be considered a hardening treatable alloy in that solid phase transformation can take place with only a small portion of the alloy going through a solid state phase transformation. In the as-hardened condition (1700° F.), the P1 powder can have an increased interdendritic region and decreased intradendritic region compared to the same alloy in an as-cast condition. The increase in interdendritic region is through a diffusion process between the interdendritic and intradendritic regions at elevated temperature such as hardening at 1700° F. It is estimated that about 25 vol. % of the interdendritic region is sigma phase and about 25 vol. % of intradendritic region is sigma phase. It is also estimated that about 75 vol. % of high Cr high-Mo ferrite exists in the interdendritic region and about 75 vol. % of γFe,αCo solid solution (fcc) phase exists in the intradendritic region.

Thus, the P1 powder in a hardened or hardened+tempered condition with 50 vol. % intradendritic and 50 vol. % interdendritic regions, the microstructure may contain up to about 37.5 vol. % of high Cr and Mo ferrite phase, up to about 37.5 vol. % of γFe,αCo solid solution (fcc) phase, up to about 25.0 vol. % of sigma phase with the balance up to about 5.0 vol. % of a mixture of bainite, martensite, and carbide phases.

In an embodiment, a sintered valve seat insert can be manufactured by preparing a powder admixture of, in weight %, 40-60 wt. % of the first iron-base powder, 20-40 wt. % of the second iron-base powder, 15-25 wt. % pure iron powder, optionally up to 5 wt. % copper powder, optionally up to 5 wt. % manganese sulfide and optionally up to 5 wt. % die lubricant. The powder admixture can be compacted into the shape of a valve seat insert (VSI) suitable for use in internal combustion engines and sintered (e.g., single pressing and sintering or double pressing and sintering) with or without copper infiltration. The sintered valve seat insert can be subjected to a cryogenic treatment to modify the microstructure of the sintered VSI. During sintering, the iron powder can diffuse into the second iron-base powder and/or elements such as Cu, Cr and Mo from other powders can diffuse into the iron powder.

In the sintered VSI, the first iron-base powder can include sigma phase in the interdendritic and intradendritic regions. For example, up to 30 vol. % sigma phase (e.g., 20-30 vol. % sigma phase) can be present in the interdendritic region and up to 30 vol. % sigma phase (e.g., 20-30 vol. % sigma phase) can be present in the intradendritic region. With an addition of 40-60 wt. % of the first iron-base powder to the powder admixture, the sintered VSI can contain 8-18 vol. % sigma phase (e.g., 10-15 vol. % sigma phase).

In the sintered VSI, the first iron-base powder can include an iron-cobalt (Fe—Co) face centered cubic (FCC) solid solution phase. For example, the intra-dendritic region can include 60-90 vol. % (e.g., 70-80 vol. %) Fe—Co solid solution phase. With an addition of 40-60 wt. % of the first iron-base powder to the powder admixture, the sintered VSI can contain 10-30 vol. % Fe—Co solid solution phase (e.g., 15-25 vol. % Fe—Co solid solution)

In the sintered VSI, the first iron-base powder can include ferrite (e.g., high chromium ferrite) in the interdendritic region. For example, up to 60-90 vol. % ferrite (e.g., 70-80 vol. % ferrite) can be present in the interdendritic region. With an addition of 40-60 wt. % of the first iron-base powder to the powder admixture, the sintered VSI can contain 10-30 vol. % high chromium ferrite phase (e.g., 15-25 vol. % high chromium ferrite).

In the sintered VSI, the second iron-base powder can include 70-80 vol. % (e.g., about 75 vol. %) of tempered martensite and 20-30 vol. % (e.g., about 25 vol. %) of chromium-molybdenum carbide. With the addition of 20-40 wt. % of the second iron-base powder to the powder admixture, the sintered VSI can contain 10-30 vol. % tempered martensite and 5-10 vol. % chromium-molybdenum carbide.

For pure iron powder, a significant elemental diffusion process occurs during a sintering process. Depending upon post sintering treatment conditions, the pure iron powder can be composed of ferrite, bainite, martensite or their combinations. From a VSI application concern, liquid nitrogen cryogenic treatment for JP513 VSI can be applied. In that case, greater than 90 vol. % of the combined pure iron powder/second iron-base powder can be composed of tempered martensitic phase along with up to 10 vol. % of ferrite, or bainite, or ferrite+bainite. In the sintered VSI, the pure iron powder can include up to 10 vol. % ferrite (or bainite or bainite plus ferrite). Thus, with an addition of 10-20 wt. % of the pure iron powder to the powder admixture, the sintered VSI can contain 1-2% ferrite, bainite or ferrite plus bainite.

The sintered VSI can be heat treated via a hardening and tempering treatment to provide a tempered martensitic microstructure. For example, the heat treated sintered VSI can include at least 25 vol. % (e.g., 30-40 vol. %) tempered martensite.

In an example, the sintered and heat treated VSI can include 10-15 vol. % (e.g., 12-13 vol. %) sigma phase, 30-40 vol. % (e.g., 34-36 vol. %) martensite, 20-25 vol. % (e.g., 21-23 vol. %) ferrite, up to 2 vol. % bainite, 20-25 vol. % (e.g., 21-23 vol. %) iron-cobalt solid solution phase, and 5-10 vol. % of high chromium carbides.

In the forgoing examples, J120V was used as a P2 powder. J120V includes, in weight %, 1.2-1.5% C, 0.3-0.6% Mn, 0.3-0.6% Si, 3.5-4.25% Cr, 6-7% Mo, 5-6% W, 1.3-1.7% V, balance Fe. Another iron-base alloy which can be used as the P2 powder is J160 which includes 1.35-1.55% C, 0.2-0.5% Mn, 0.4-0.8% Si, up to 0.8% Ni, 12.5-13.5% Cr, 5.1-5.7% Mo, up to 0.3% Cu, 3.75-4.25% W, 1-1.5% V, 3.2-4.2% Co, 1.75-2.25% Nb, balance Fe.

The preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A powder admixture useful for making a sintered valve seat insert, the powder admixture consisting of a first iron-base powder in an amount of 40-60 wt. %, a second iron-base powder in an amount of 20-40 wt. %, up to 20% Fe powder, up to 3% Cu powder, up to 2% MnS powder, and up to 2% die lubricant, wherein the first iron-base powder has a higher hardness than the second iron-base powder, the first iron-base powder consisting of, in weight percent, 1-2% C, 10-25% Cr, 5-20% Mo, 15-25% Co, 30-60 wt. % Fe, up to 1% Mn, up to 1% Si, up to 5% Ni, up to 5% W, up to 2% V, up to 0.5% B, up to 0.1% P, up to 0.1% S, up to 0.5% N, and up to 5% Nb, and the second iron-base powder consisting of, in weight %, 1-1.5% C, 3-15% Cr, 5-7% Mo, 3-6% W, 1-1.7% V, 60-85% Fe, up to 1% Mn, up to 1% Si, optional Ni, optional Co, and optional Nb.

2. The powder admixture of claim 1, wherein the first iron-base powder has a microstructure of interdendritic and intradendritic phases with up to 25% sigma phase.

3. The powder admixture of claim 1, wherein the powder admixture includes Fe powder, Cu powder and MnS powder, the first iron-based powder is present in an amount of 40-60 wt. %, the second iron-based powder is present in an amount of 20-40 wt. %, the Fe powder is present in an amount of 15-20 wt. %, the Cu powder is present in an amount of 1-3%, and the MnS powder is present in an amount of 0.1-1 wt. %.

4. The powder admixture of claim 1, free of additive silicide, carbide, nitride, carbonitride and intermetallic hard powder particles.

5. The powder admixture of claim 1, wherein the first iron-base powder has a microstructure consisting of 40-60 vol. % interdendritic and 60-40 vol. % intradendritic regions.

6. The powder admixture of claim 1, free of Co-base, Mo-base, or other hard particle powders having a hardness greater than the hardness of the first iron-base powder.

7. A sintered valve seat inert comprising the powder admixture of claim 1, wherein the powder admixture has been compacted in the shape of a valve seat insert, sintered to form a sintered powder admixture optionally infiltrated with copper.

8. The sintered valve seat insert of claim 7, wherein the sintered powder admixture has a density of at least 7.5 g/cm$^3$.

9. The sintered valve seat insert of claim 7, wherein the first iron-base powder has a microstructure consisting of 40-60 vol. % interdendritic and 60-40 vol. % intradendritic regions.

10. The sintered valve seat insert of claim 7, wherein the sintered admixture is free of hard particle powders having a hardness greater than the hardness of the first iron-base powder.

11. The sintered valve seat insert of claim 7, wherein the sintered admixture is free of additive silicide, carbide, nitride, carbonitride, Mo-base, Co-base or intermetallic hard particle powders.

12. The sintered valve seat insert of claim 7, wherein the first iron-based powder is present in an amount of 40-60 wt. %, the second iron-based powder is present in an amount of 20-40 wt. %, and Fe powder is present in an amount of 15-20 wt. %.

13. The sintered valve seat insert of claim 7, wherein the first iron-based powder is present in an amount of 40-60 wt. %, the second iron-based powder is present in an amount of 20-40 wt. %, Fe powder is present in an amount of 15-20 wt. % and copper is present in an amount of 10-15 wt. %.

14. A method of manufacturing the sintered valve seat insert of claim 7, comprising forming an admixture by mixing the first iron-based powder with the second iron-based powder, compacting the admixture, and sintering the admixture.

15. The method of claim 14, wherein the sintering comprises preheating the powder admixture at 560° C., 850° C., and 950° C. for 16 minutes followed by 1120° C. sintering for 48 minutes.

16. The method of claim 14, wherein (a) the sintering comprises a pressing and sintering process; (b) the method further comprising subjecting the sintered valve seat insert to cryogenic treatment in liquid nitrogen; (c) the method further comprising subjecting the sintered valve seat insert to a steam treatment; and/or (e) the sintering is carried out while infiltrating the admixture with copper.

* * * * *